United States Patent
Paul et al.

(10) Patent No.: US 11,692,154 B2
(45) Date of Patent: Jul. 4, 2023

(54) DIMETHICONE COPOLYOL COMPOSITION AND ITS APPLICATION AS AN ADDITIVE IN DETERGENT COMPOSITION TO ENHANCE FOAMABILITY AND CLEANING EFFECT

(71) Applicant: Wacker Metroark Chemicals PVT LTD, Bishnupur (IN)

(72) Inventors: Amit Kumar Paul, Kolkata (IN); Kalon Chatterjee, Kolkata (IN); Arjun Ghosh, Kolkata (IN); Pallab Mondal, Kolkata (IN)

(73) Assignee: WACKER METROARK CHEMICALS PVT LTD, West Bengal (IN)

( * ) Notice: Subject to any disclaimer, the term of this patent is extended or adjusted under 35 U.S.C. 154(b) by 0 days.

(21) Appl. No.: 17/284,570

(22) PCT Filed: Sep. 20, 2019

(86) PCT No.: PCT/IB2019/057969
§ 371 (c)(1),
(2) Date: Apr. 12, 2021

(87) PCT Pub. No.: WO2020/074986
PCT Pub. Date: Apr. 16, 2020

(65) Prior Publication Data
US 2021/0309936 A1   Oct. 7, 2021

(30) Foreign Application Priority Data
Oct. 12, 2018  (EP) .................................... 18200091

(51) Int. Cl.
| | | |
|---|---|---|
| *C11D 1/82* | (2006.01) | |
| *C08G 77/46* | (2006.01) | |
| *C11D 3/00* | (2006.01) | |
| *C11D 3/20* | (2006.01) | |

(52) U.S. Cl.
CPC ............... *C11D 1/82* (2013.01); *C08G 77/46* (2013.01); *C11D 3/0094* (2013.01); *C11D 3/2093* (2013.01)

(58) Field of Classification Search
CPC .. C11D 1/82; C11D 1/83; C11D 7/266; C11D 9/12; C11D 11/0017; C11D 11/0023
See application file for complete search history.

(56) References Cited

U.S. PATENT DOCUMENTS

| | | | |
|---|---|---|---|
| 3,957,843 A | 5/1976 | Bennett | |
| 5,759,983 A | 6/1998 | Mondin et al. | |
| 6,232,272 B1 | 5/2001 | Roberts et al. | |
| 6,425,959 B1 | 7/2002 | Man | |
| 6,525,015 B2 | 2/2003 | Man et al. | |
| 6,949,496 B1* | 9/2005 | Boutique ............. | C11D 3/2024 510/276 |
| 8,481,476 B2 | 7/2013 | Paul | |
| 2004/0102345 A1* | 5/2004 | Orchowski ............ | C11D 3/384 510/256 |
| 2006/0189508 A1 | 8/2006 | Brooker et al. | |
| 2009/0075858 A1 | 3/2009 | Tomarchio et al. | |
| 2009/0084402 A1 | 4/2009 | Morrison et al. | |
| 2010/0081596 A1 | 4/2010 | Rong et al. | |
| 2018/0265825 A1* | 9/2018 | Park .................... | C11D 11/0017 |

FOREIGN PATENT DOCUMENTS

| | | |
|---|---|---|
| EP | 1127939 A1 | 8/2001 |
| WO | 1998030662 A1 | 7/1998 |
| WO | 2007044552 A1 | 4/2007 |
| WO | 2008111926 A2 | 9/2008 |
| WO | 2010010475 A2 | 1/2010 |
| WO | 2013075977 A1 | 5/2013 |
| WO | 2013126696 A2 | 8/2013 |
| WO | 2017010473 A1 | 1/2017 |

OTHER PUBLICATIONS

International Search Report and Written Opinion for International Application PCT/IB2019/057969; International Filing Date: Sep. 20, 2019; dated Jan. 24, 2020; 9 pages.
International Preliminary Report on Patentability for International Application PCT/IB2019/057969; International Filing Date: Sep. 20, 2019; dated Mar. 31, 2021; 17 pages.

* cited by examiner

*Primary Examiner* — Charles I Boyer
(74) *Attorney, Agent, or Firm* — Cantor Colburn LLP

(57) ABSTRACT

The invention to provide an foamable silicone composition, that would easily integrate or mix with the powder or liquid detergent composition having reduced active ingredient having enhanced or similar detergency effect i.e. foaming and dirt removal characteristics and having no negative effect on the detergency and the preferred foaming nature of the detergent during the washing cycle. The foamable silicone composition comprising a silicone composition comprising a siloxane comprising a polyoxyalkylene group having 19 to 30 oxyalkylene group, with the proviso that the siloxane contain at least one oxyalkylene radical per molecule.

10 Claims, No Drawings

DIMETHICONE COPOLYOL COMPOSITION AND ITS APPLICATION AS AN ADDITIVE IN DETERGENT COMPOSITION TO ENHANCE FOAMABILITY AND CLEANING EFFECT

CROSS REFERENCE TO RELATED APPLICATIONS

This application is a National Stage application of PCT/IB2019/057969, filed Sep. 20, 2019, which claims the benefit of priority to European Patent Publication No. 18200091.9, filed Oct. 12, 2018, both of which are incorporated by reference in their entirety herein.

FIELD OF INVENTION

Present invention is related to a foamable silicone composition, that would easily integrate or mix with the powder or liquid detergent composition having reduced active ingredient with enhanced or similar detergency effect i.e. stable foaming, dirt removal characteristics, and no negative effect on the detergency and the preferred foaming nature of the detergent during the washing cycle.

In today's world, there are huge volumes of detergents that are used for millions of household all over the world and in different industries. These detergents use high active detergent for good foaming and cleaning. Anionic surfactant is the main component in the detergent, higher amount of anionic surfactant by way of rinse water enters the water system. Higher amount of detergent with anionic surfactant in the water system dis-balances and creates unfavourable condition for the aquatic life. Such entry into the waterbody will pollute the water and adversely affect the aquatic life.

These detergents comprises mainly anionic surfactants as active ingredients, where the anionic surfactant group mainly include but not limited to sulfonic acid salts & it's derivatives, alcohol sulfates, alkyl benzene sulfonates, phosphoric acid esters, and carboxylic acid salts. Such surfactant needs high amount of water for rinsing to remove the surfactant, which results huge amount clean water wastage. Also, such anionic surfactants are harsh in nature and the colour of the clothes become dull after multiple wash. Also, higher amount of chemicals used in the detergent has indirect responsibility to increase the carbon footprint. Higher amount of non-ionic surfactant or anionic surfactant means higher amount of chemicals from non-renewable sources.

Specially, in case of hand-wash detergents, the most effective criteria is to consider by consumer that detergent is considered as good and effective detergent when it delivers stable foaming property and finally removes soil or improve cleaning efficiency. The active ingredients in the detergent composition are responsible for the foam building or boosting and cleaning or soil removal activity in the detergent solution while washing. Such active ingredient is present in the detergent composition from 8 to 30 percent and these active ingredients is one of the critical cost factor of the detergent formulation.

Other than the surfactants, there are other ingredients like builders (e.g. soda ash, sodium triphosphate, sodium silicate, zeolite, sodium citrate), fillers (e.g. sodium chloride, sodium sulphate, China clay, dolomite, calcite etc), enzymes, anti-redeposition agent (e.g. sodium carboxymethyl cellulose, Polyethylene glycol (PEG), Polyvinyl alcohol, Polyvinyl pyrrolidone etc for preventing soil from redepositing again after removal during washing, bleaching agent (e.g. Sodium perborate, Hydrogen Peroxide, Chlorine that help remove stain by oxidizing), optical brighteners, fabric softeners, preservative, hydro-tropes, fragrance, processing aid and foam regulators for preventing foam formation or foam collapse specially for front load washing machines.

If the active ingredient is reduced by certain percentage to reduce the effect on environment or to reduce the cost, the performance like foam building or boosting and the cleaning effect of such composition will also get affected/reduced. If the active ingredients in the detergent composition has to be reduced or replaced, the new detergent composition has to be redesigned whose foam height needed to be constantly maintained and the foam density needed to be maintained without getting defoamed during the soaking time.

Thus if it is intended to decrease the anionic surfactant composition then the overall performance of the detergent will not be at per. Thus there is a need of disruptive innovation for sustainable detergent business. There is a need of developing such a detergent composition having reduced active ingredient with enhanced or similar detergency effect i.e. stable foaming and dirt removal characteristics and having no negative effect on the detergency and the preferred foaming nature of the detergent during the washing cycle.

There is also a need to use as less surfactant as possible as it harms the environment and also contributed to the aquatic toxicity. There is also another benefit for using lesser surfactant means lesser generation of carbon dioxide (less greenhouse gas) & less petroleum product consumption.

BACKGROUND

There are few prior art that described silicone in different compositions:

In the PCT application WO1998030662A1, it relates to a highly alkaline or mildly alkaline detergent composition having enhanced cleaning properties. Here, the preferred surfactant, SILWET" L77, has the formula: $(CH_3)_3Si—O(CH_3)Si(R^1)O—Si(CH_3)_3$, wherein $R^1$=—$CH_2CH_2CH_2$-0-$[CH_2CH_2O]_zCH_3$; wherein z is 4 to 16 preferably 4 to 12, most preferably 7-9. Such molecule having lower Ethylene Oxide (EO) groups (i.e. [CH2CH2O] group) do not give the desired result. Such molecule do not provide the desired stable foam characteristics and it is also observed that in such composition the foam properties are not at par and the foam height and stability is not at par with the commercial detergent available in the market.

In the patent application U.S. Pat. No. 6,425,959B1, the compositions comprise nonionic surfactants, silicone surfactants, hydrotropes and other optional functional materials including sequestrants. Substrates such as laundry and heavily soiled hard surfaces containing a substantial proportion of organic/inorganic soils such as greases, oils and other hard to remove soil materials are readily cleaned by the cleaner compositions of the invention. As the non-ionic surfactant is a block EOPO copolymer, it does not give the desired stable foam characteristics and it is also observed that in such composition the foam properties are not at par and the foam height and stability is not at par with the control sample.

Similarly, US2009075858, in claim 4 of this reference: trisiloxane have the formula (II): $(CH_3)_3SiO(CH_3)Si(R4)OSi(CH_3)_3$ (II), wherein R4=—$(CH_2)_xO(C_2H_4O)_y(CHCH_3CH_2O)_zR5$; where x is 1 to 10, wherein y is 1 to 16, and wherein z is 1 to 12; and wherein R5 is H or $CH_3$. The number of EO is less which does not give the desired result and performance, also propylene oxide groups (PO groups)

(i.e. (CH(CH$_3$)CH$_2$O)) such group adversely affect the foamability and cleaning and detergency property.

In the patent application U.S. Pat. No. 5,759,983, there is an improvement is described in all-purpose liquid cleaning composition and micro emulsion composition which are especially effective in the removal of oily and greasy soil and contains a quick drying agent, an anionic detergent, optionally, a partially esterified ethoxylated polyhydric type alcohol, a secondary alcohol cosurfactant, a hydrocarbon ingredient, and water. Here, a block silicone copolymer mentioned in the claim and it does not give the desired result of foamable, also a trisiloxane is mentioned where EO group is restricted from 5 to 18, and such range do not work as an optimum foam booster or foaming in the detergent composition.

In application WO2010010475, it describes a foaming alcohol composition, and as it is common knowledge that alcohol acts as a defoaming agent and in this composition the lower EO silicones are acting as a propellant in the composition. In example 1 the foam height screening is done which is an ethanol solution with a silicone surfactant. As described in the application, the linear PEG-8 dimethicone and PEG-10 dimethicone is showing the best foam height i.e. >23 mm, whereas PEG/PPG-25/25 dimethicone pendent is showing the foam height of 8 mm. This patent application is a different composition and different molecule altogether and the results are different. Such PEG-8 dimethicone and PEG-10 dimethicone do not show appropriate foam height and stable foam and do not give appropriate cleaning property.

In the application, WO2007044552 which mention about the hydrolysis resistant organo modified disiloxane surfactant, this is a disiloxane type of molecule, also the EO group is lesser units in the terminal end and such less EO groups do not give the optimum and stable foaming composition. Moreover objective of this reference is resistance to hydrolysis over a wide pH range and do not discloses the current objective.

The references, U.S. Pat. No. 6,232,272, EP1127939A1, US20060189508A1, US20090084402A1 discloses an organosilicone surfactant which has lower number of EO groups. Such lower EO group molecules are used as spreading aid and are mainly used for agricultural applications.

In WO13126696, The silane surfactant used is different in structure. Antimicrobial alcoholic composition having an amount of alcohol of at least about 40 weight percent, this composition cannot give the desired foamability as it is common knowledge that alcohol acts as a defoamer.

In the reference, WO2013075977, This composition acts as an adjuvant and in this application Adjuvants may be described as compositions, which have a neglectable or even no pesticidal activity themselves, and which improve the biological performance of a pesticide on the target. The trisiloxane used in the adjuvant compositions are having less EO units and such molecules do not give the desired foaming and foam stability, the weight ratio of the ester and the trisiloxane is different and ester is at higher percentage than trisiloxane and such type of weight ratio do not give the desired result.

In the patent application reference, US2010081596, this formulation in the field of cleaning agents for cleaning hard surfaces, in particular dishes, that contributes to a considerable improvement in the drying and draining properties. This composition does not produce desired foaming effect. Also, structurally this compound is different as it is the multi-armed silyl polyalkoxylate (Six-Arm Triethoxysilyl Terminated Polyalkoxylate).

U.S. Pat. No. 6,525,015B2 here this molecule has preferred silicone surfactants and preferred silicone surfactant has the formula: (CH$_3$)$_3$SiO(CH$_3$)Si(R1)OSi(CH$_3$)$_3$, wherein, R1 is —CH$_2$CH$_2$CH$_2$O(CH$_2$CH$_2$O)$_z$CH$_3$ and wherein z is 4 to 16 preferably 4 to 12, most preferably 7-9. Such molecule having lower Ethylene Oxide (EO) groups (i.e. [CH2CH20] group) do not give the desired result. Such molecule do not provide the desired stable foam characteristics and it is also observed that in such composition the foam properties are not at par and the foam height and stability is not at par with the commercial detergent available in the market. The non-ionic non-EO surfactant is alkyl polyglycoside and the weight ratio is different and such compositions do not provide the optimum foaming effect.

WO2017010473 describes the cleaning compositions for hard surfaces; it has no mention of foaming actives.

Thus, though there are solutions available for stain removal from the stained/hard surface and enhanced cleaning property, there are no solutions described that reduces the active ingredient from the detergent composition and which maintain the similar detergency properties with equivalent or enhanced foam building or boosting properties as well as maintaining or enhancing the cleaning effect.

SUMMARY OF INVENTION

In the literature, it is mentioned that the polyoxyalkylene trisiloxane having 10 to 15 oxyalkylene groups are used in the hard surface cleaning composition with other additives, which gives a better hard surface cleaning properties. We have tried with higher and lower polyoxyalkylenes trisiloxane in the laboratory to find out if such disclosed composition can meet the required foaming properties of the detergent. But, such experiment did not give good result for the desired foaming property in the composition having 10 to 15 oxyalkylene groups in trisiloxane. We have also tried with higher polyoxyalkylenes siloxane in the laboratory, and surprisingly observed—higher foaming effect from the poly oxyalkylene of 19 to 30 oxyalkylene group siloxane—gave the—desired result. Optimum foaming character is observed with an average 24-polyoxyalkylene group attached with siloxane.

Particular polyoxyalkylene-siloxane having 24 oxyalkylene groups in average is giving a very good foaming and foam boosting property, including better cleaning efficacy and improved slippery hand-feel.

To look further into whether this particular polyoxyalkylene-siloxane having 24 oxyalkylene groups can replace the active surfactant in the detergent, we found to our surprise that if we reduce the active component in the detergent (i.e. linear alkyl benzene sulfonic acid) up to 40%, and use as less as 1% by weight of the foaming silicone composition comprising this siloxane having 24 oxyalkylene in average (approx. 15% by weight) loaded on a filler material (approx. 85% by weight) and make up the reduced volume by normal soda ash or sodium sulfate or mix or any other fillers that do not have any negative effect on detergent composition, the foaming improves drastically and is equal to or sometimes better than the initial detergent composition (i.e. detergent without reduced active surfactant). Also, the cleaning or after wash hand feel properties remain similar or many a times improved with respect to the detergent compositions available in the market.

OBJECT OF INVENTION

It is thus an object of the invention to provide an foamable silicone composition, that would easily integrate or mix with the powder or liquid detergent composition having reduced active ingredient having enhanced or similar detergency effect i.e. foaming and cleaning or dirt/soil removal characteristics and having no negative effect on the detergency and the preferred foaming nature of the detergent during the washing cycle.

Another object of the present invention is directed to a selective provision of a foamable composition comprising a silicone fluid together with carrier filler, which may be used in detergent compositions with minimum dosage in the detergent formulation directed to effective washing and avoiding using high surfactant detergent composition.

Still another objective is to accommodate the variation in the product due to the powder mix kind of product where there is a possibility of different concentration, but even such variation occurs the performance of the product remains constant and do not vary.

DETAILED DESCRIPTION

It has surprisingly found that the use of the current silicone composition, which is a foamable silicone composition comprising a silicone composition comprising a siloxane comprising a polyoxyalkylene group represented by the following general formula:

$$(R^1{}_{3-a}Y_aSiO_{1/2})_j(R^3{}_{2-b}Y_bSiO_{2/2})_k(R^2{}_2SiO_{2/2})_p, \qquad (I)$$

wherein, $R^1$ is same or different and is selected from an alkyl, alkenyl or aryl alkyl group from 1-20 C atom, or alkyl, alkenyl or aryl alkyl group from 1-20 C atom comprising a functional group, or mixtures thereof, Y is a polyoxyalkylene group having 19 to 30 oxyalkylene group, $R^2$ and $R^3$ are same or different and is selected from an alkyl, alkenyl or aryl alkyl group from 1-20 C atom, or alkyl, alkenyl or aryl alkyl group from 1-20 C atom comprising a functional group, wherein, a is 0, 1 or 2, b is 1 or 2, p is 0 to 20 preferably 0, 1, 2 or 3, j, k, are independent of each other and is 0 or an integer from 1 to 50, where either j or k or both is at least 1, where, if a is 0 then p is 0, 1, 2 or 3, and if a is 1 or 2 then p is 0 or an integer from 1 to 50, with the proviso that the siloxane contain at least one Y radical per molecule.

In one of the embodiment, when k is at least 1 and b is 1 or 2, a is 0 and j is 2 then p is 0, 1, 2 or 3.

In one of the embodiment, when a is 1 j is 2, and k is 0 then p is an integer from 1 to 30. In another embodiment, when a is 1 j is 2 and k is 0 then p is 0.

This foamable silicone composition when mixed in a reduced active detergent composition gives an appropriate desired foam height after reduction of active content from the detergent composition. This foam after attaining the desired height is also stable for a longer time and gives a better cleaning effect.

Preferably $R^2$ and $R^3$ are same or different and is a $C_1$ to $C_{20}$ alkyl radical. Examples of alkyl radicals R are the methyl, ethyl, n-propyl, isopropyl, 1-n-butyl, 2-n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radicals, decyl radicals, such as the n-decyl radical, dodecyl radicals, such as the n-dodecyl radical, and octadecyl radicals, such as the n-octadecyl radical. For $R^1$, $R^2$ and $R^3$ the preferred group is the alkyl group. Preferably $R^2$, $R^3$ is a methyl radical.

In one of the embodiments, Y is a polyoxyalkylene group having 19 to 30 oxyalkylene group of the formula $-R^5(OR^4)_gOR'$, where $R^4$ is same or different and is a $C_1$ to $C_{10}$ alkylene radical and preferably a $C_2$ alkylene radical, $R^5$ is same or different and is a $C_1$ to $C_{10}$ alkylene radical, R' are same or different and are a hydrogen atom or a $C_1$ to $C_6$ alkyl group, preferably a hydrogen atom, and g is from 19 to 30.

The foamable silicone composition may be termed different from silicone composition as the foamable silicone composition may contain optional additive that improves foamability of the silicone composition and is selected from but not limited to an alkyl ester of fatty acid.

In the foamable silicone composition the weight ratio of the siloxane to additive is from 1 part to about 10 parts by weight of the siloxane (in silicone composition) per each part of the additive, i.e. the ratio of siloxane:additive is 1:1 to 10:1.

According to a basic aspect of the invention, there is provided a foamable silicone composition used in fluid-base and powder-based detergent formulation where the foamable silicone composition where the siloxane containing a polyoxyalkylene group represented by the formula:

$$Y_aR^1{}_{3-a}SiO(R^2{}_2SiO)_p(YR^3SiO)_mSiR^1{}_{3-a}Y_a \qquad (IV)$$

wherein, R1 is same or different and is selected from an alkyl, alkenyl or aryl alkyl group from 1-20 C atom, or alkyl, alkenyl or aryl alkyl group from 1-20 C atom comprising a functional group, alkoxy, and hydroxyl group or mixtures thereof, Y is a polyoxyalkylene group having 19 to 30 oxyalkylene group of the formula $-R^5(OR^4)_gOR'$ $R^2$ and $R^3$ are same or different and is selected from an alkyl, alkenyl or aryl alkyl group from 1-20 C atom, or alkyl, alkenyl or aryl alkyl group from 1-20 C atom comprising a functional group, $R^4$ is same or different and is a $C_1$ to $C_{10}$ alkylene radical, $R^5$ is same or different and is a $C_1$ to $C_{10}$ alkylene radical, R' are same or different and are a hydrogen atom or a $C_1$ to $C_6$ alkyl group, preferably a hydrogen atom, where, a is 0 or an integer from 1 to 2, p is 0 or an integer from 1 to 3, m is 0 or an integer from 1 to 50, g is from 19 to 30, with the proviso that the siloxane contain at least one Y radical per molecule. $R^4$ is same or different and is a $C_2$ alkylene radical. Where, if a is 0 then p is 0, 1, 2 or 3, and if a is 1 or 2 then p is 0 or an integer from 1 to 50, with the proviso that the siloxane contain at least one Y radical per molecule.

In one of the embodiment, when k is at least 1 and b is 1 or 2, a is 0 and j is 2 then p is 0, 1, 2 or 3.

In one of the embodiment, when a is 1 j is 2, and k is 0 then p is an integer from 1 to 30. In another embodiment, when a is 1 j is 2 and k is 0 then p is 0.

In one of the other embodiments, the polyoxyalkylene group is polyoxyethylene group. In one of the embodiments, the number of Silicon units the in the siloxane with pendant polyoxyalkylene group is 3-6 Si units, and for siloxane with terminal polyoxyalkylene group is 15-20 Si units.

In one of the embodiments, the solid foamable silicone composition comprising:

a) 10 to 35% of a silicone composition comprising:

a siloxane containing a polyoxyalkylene group represented by the following general formula:

$$(R^1{}_{3-a}Y_aSiO_{1/2})_j(R^3{}_{2-b}Y_bSiO_{2/2})_k(R^2{}_2SiO_{2/2})_p, \qquad (I)$$

wherein, $R^1$ is same or different and is selected from an alkyl, alkenyl or aryl alkyl group from 1-20 C atom, or alkyl, alkenyl or aryl alkyl group from 1-20 C atom comprising a functional group, or mixtures thereof, Y is a polyoxyalkylene group having 19 to 30 oxyalkylene group, $R^2$ and $R^3$ are same or different and is selected from an alkyl, alkenyl or aryl alkyl group from 1-20 C atom, or alkyl, alkenyl or aryl alkyl group from 1-20 C atom comprising a functional group, wherein, a is an integer from 0 to 2, b is an integer from 1 to 2, p is an integer from 0 to 3, j, k, are independent of each other and are integers from 0 to 50, where either j or k or both is at least 1, and b) 0 to 10% of an additive that improves foamability of the silicone composition, c) 55 to 90% of filler. In one of the embodiments, the solid could be in the form of powder, flakes, tablets, granules having different bulk densities.

In one of the embodiments, the additive that improves foamability of the silicone composition is selected from but not limited to an alkyl ester of fatty acid. Specifically it improves foamability with the siloxane containing a polyoxyalkylene group i.e. the Y group at the terminal. The alkyl ester of fatty acid is selected from but not limited to fatty acid alkyl or alkylene esters based on C6-C22 fatty acids and in one embodiment specifically methyl ester of fatty acid. Fatty acid alkyl esters e.g. methyl or ethyl esters of vegetable oils (Agnique ME 18 RD-F, Agnique ME 18 SD-F, Agnique ME 12C-F, Agnique ME1270, all products of Cognis GmbH, Germany now BASF) fatty acid alkyl or alkylene esters based on C6-C22 fatty acids. Other suitable may be selected from esters of linear C6-C22-fatty acids with linear or branched C6-C22-fatty alcohols or esters of branched C6-C13-carboxylic acids with linear or branched C6-C22-fatty alcohols. Also suitable are esters of linear C6-C22-fatty acids with branched alcohols, esters of C18-C38-alkylhydroxy carboxylic acids with linear or branched C6-C22-fatty alcohols, and/or branched fatty acids with polyhydric alcohols.

Filler is carrier filler selected from the group consisting of sodium carbonate, sodium sulphate, aluminium silicate, potassium carbonate, potassium sulphate, sodium bicarbonate, potassium bicarbonate and zeolite.

The solid foamable silicone composition where the polyoxyalkylene group is a polyoxyethylene group.

In one of the embodiments, the liquid foamable silicone composition comprising:
a) 10 to 35% of a silicone composition comprising:
a siloxane containing a polyoxyalkylene group represented by the following general formula:

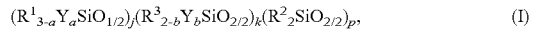
$(R^1{}_{3-a}Y_aSiO_{1/2})_j(R^3{}_{2-b}Y_bSiO_{2/2})_k(R^2{}_2SiO_{2/2})_p$,    (I)

wherein, $R^1$ is same or different and is selected from an alkyl, alkenyl or aryl alkyl group from 1-20 C atom, or alkyl, alkenyl or aryl alkyl group from 1-20 C atom comprising a functional group, or mixtures thereof, Y is a polyoxyalkylene group having 19 to 30 oxyalkylene group, $R^2$ and $R^3$ are same or different and is selected from an alkyl, alkenyl or aryl alkyl group from 1-20 C atom, or alkyl, alkenyl or aryl alkyl group from 1-20 C atom comprising a functional group, where, a is an integer from 0 to 2, b is an integer from 1 to 2, p is an integer from 0 to 3, k, are independent of each other and are integers from 0 to 50, where either j or k or both is at least 1, b) 0 to 10% of an additive that improves foamability of the silicone composition,
c) 55 to 90% of a protic solvent.

In one of the embodiments, a protic solvent means solvents capable of producing proton(s) by dissociating themselves. The non-limiting example of the protic solvent is water; alcohols such as methanol and ethanol; carboxylic acids such as acetic acid; phenol; and liquid ammonia, preferably the protic solvent is water.

In one of the embodiments, the liquid foamable composition is composed of primarily of linear alkyl benzene sulfonic acid approx. from 15 to 25 wt % in addition to some alcohol, stabilizers, and perfume and balanced with water with or without a surfactant. Here, surfactant may act as an emulsifier if the liquid foamable silicone composition is not soluble in water at room temperature (25° C.). Particularly suitable surfactant is a non-ionic emulsifiers include alkyl polyglycol ethers, alkylated fatty alcohol alkyl aryl polyglycol ethers, ethylene oxide/propylene oxide (EO/PO) block polymers, fatty acids, natural substances and their derivatives, such as lecithin, lanolin, saponins, cellulose; cellulose alkyl ethers and carboxyalkylcelluloses, saturated and unsaturated alkoxylated fatty amines. Preferable non-ionic emulsifier is an alkylated fatty alcohol a non-limiting example of alkylate fatty alcohol is polyoxyether of lauryl alcohol ($CH_3(CH_2)_{10}CH_2OH$).

The viscosity of the siloxane containing a polyoxyalkylene group in the form of wax and semisolid is heated to 50° C. to be measured at 50° C. and viscosity of silicone fluid is measured at 25° C. The viscosity is measured at 25° C. or at 50° C. by Anton Paar Rheometer; model MCR101, geometry single gap cylinder: CC 27 spindle or cone plate of 60 mm diameter and 2° and shear rate 1 s$^{-1}$. The measurement is repeated thrice. MCR Rheometer Series products work as per USP (US Pharmacopeia Convention) 912—Rotational Rheometer methods.

The foamable silicone composition may be 100% pure or may further contain some amount of side products. The foamable silicone composition may further contain some small quantity of silicon material may be due to the side product of the fluid preparation by the hydrosilylation reaction. Such silicone material are like cyclosiloxane, small chain polydimethyl siloxane, or polyoxyalkylene siloxane having less than 19 polyoxyalkylene group, or polyoxyalkylene siloxane having more than 30 polyoxyalkylene group, alkyl silanes. The quantity of such silicon material will be less than 5% of the foamable silicone composition.

During the preparation step of the siloxane for the silicone composition, In the second step of the process of the present invention the allyloxy(polyethylene oxide) (available as Polymeg brand from IGL, India) is taken in 10% excess to that of the rearranged H-siloxane obtained from the first step.

Allyloxy(polyethylene oxide) or olefinic unsaturated polyether is preferably selected from polyethylene glycol allyl methyl ether $CH_2=CHCH_2(OC_2H_4)_nOH$; $CH_2=CHCH_2(OC_3H_6)_nOH$; polyalkylene glycol allyl methyl ether (EO/PO random) $CH_2=CHCH_2O(C_2H_4O)_l(C_3H_6O)_kH$, here l and k are integers from 2 to 100, preferably from 19 to 40 and more preferably from 19 to 30. Non-limiting example of a preferred olefinic unsaturated polyether is allyloxy(polyethylene oxide) (EO 25) available as Polymeg brand from IGL, India. The olefinic unsaturated polyether is used in an amount of from 1 to 1.1 mol of the olefinic unsaturated radical (C=C) in the polyether per 1 mol Si-bonded hydrogen in the hydrogen siloxane.

In the step 1 for the synthesis of rearranged H-siloxane, the H-siloxane used where H-atom could be at the terminal or branch or both (having 0.01% to 99.9% of Hydrogen concentration). The disiloxane used is used as an end-stop material in excess for the rearrangement reaction and other trialkylterminated siloxane may be used along with the H-siloxane to obtain the desired mole of the invention material. The catalyst used is a PNCl$_2$ catalyst. The reaction temperature varies from batch to batch basis depending on the starting material and as per the required conditions of the reaction. The usual temperature of the reaction varies from 10 to 300° C., preferably from 80 to 150° C. Some of the reaction may have exotherm and required monitoring and controls are required for control within the reaction temperature. The reaction time also may vary depending upon the type of reactants, in one of the embodiments the reaction time may vary from 1 hour to 24 hours, the reaction time is usually from 1 hour to 10 hours. The reaction process may further have an optional distillation step which if present may be after or before the step 2 of the hydrosilylation reaction. The catalyst used in the rearrangement process may further be neutralized by using basic material (e.g. preferably but not limited to soda ash) to stop the further rearrangement reaction. Yield is 75 to 99% of the rearranged product of Rearranged H-siloxane.

In one of the embodiments, the invention provides a process for preparing the rearranged H-siloxane comprising:
(i) reacting in a first step
a hydrogen siloxane of the formula HR*$_2$SiO(R$_2$SiO)$_u$SiR*$_2$H OR R*$_3$SiO(RHSiO)$_u$ SiR*$_3$ OR HR*$_2$SiO(RHSiO)$_u$SiR*$_2$H wherein R* is R or R$^6$,
R is same or different and a monovalent C$_1$ to C$_{20}$ hydrocarbon radical,
R$^6$ is same or different and a C$_1$ to C$_6$ alkoxy radical or a hydroxyl radical,
u is an integer from 1 to 500,
with
a disiloxane of formula R$_3$SiOSiR$_3$ in the presence of a catalyst at a temperature of 10 to 300° C., preferably from 80 to 150° C. in one embodiment the disiloxane is taken from 10-40% of molar excess than the hydrogen siloxane, to obtain a rearranged H-siloxane of formula (R$_{3-a}$H$_a$SiO$_{1/2}$)$_j$(R$_{2-b}$H$_b$SiO$_{2/2}$)$_k$(R$_2$SiO$_{2/2}$)$_p$ ii) reacting in a second step
an olefinic unsaturated polyether or its mixture with the rearranged H-siloxane of the formula CH$_2$=CH—R$^9$—(OR$^4$)$_g$OR', and in one of the embodiments mixed with CH$_2$=CH—R$^9$—(OR$^4$)$_{g1}$OR', wherein R$^9$ is C$_1$ to C$_8$ alkylene radical, R$^4$ is same or different and is a C$_1$ to C$_{10}$ alkylene radical and preferably a C$_2$ alkylene radical, R$^5$ is same or different and is a C$_1$ to C$_{10}$ alkylene radical, R' are same or different and are a hydrogen atom or a C$_1$ to C$_6$ alkyl group, preferably a hydrogen atom, and g is from 19 to 30, and g1 is 1 to 18

In the presence of a catalyst comprising platinum or its compounds or complexes to form a siloxane comprising a polyoxyalkylene group of formula (R$_{3-a}$H$_a$SiO$_{1/2}$)$_j$(R$_{2-b}$H$_b$SiO$_{2/2}$)$_k$(R$_2$SiO$_{2/2}$)$_p$ where, Y is —R$^5$—(OR$^4$)$_g$OR', or mixture of —R$^5$—(OR$^4$)$_g$OR' and —R$^5$—(OR$^4$)$_{g1}$OR', wherein the g is in average from 19 to 30 in the siloxane comprising a polyoxyalkylene molecule.

The inventive structures of siloxane comprising a polyoxyalkylene group of the current invention are selected from but not limited to the following structures:

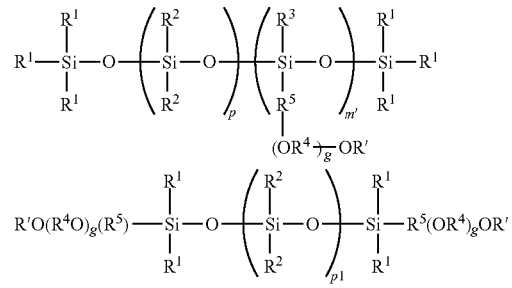

R, R$^1$, R$^2$, R$^3$, R$^4$, R$^5$, R' are defined earlier.
where, p is 0 or an integer from 1 to 3,
m' is an integer from 1 to 50, and preferably g is average from 19 to 30,
and p1 is 0 or an integer from 1 to 50, and preferably from 1 to 30, more preferably from 1 to 20,
with the proviso that the siloxane contain at least one Y radical per molecule.

In the second step of the synthesis (step 2) synthesis of polyoxyalkylene silicone by taking rearranged H-siloxane taken from step 1 or the H-siloxane available in the market with the required specification e.g. H-content, viscosity, refractive index and flash point. The reaction temperature varies from batch to batch basis depending on the starting material and as per the required conditions of the reaction. The usual temperature of the reaction varies from 10 to 300° C., preferably from 80 to 150° C. This reactor is equipped with control stirring and heating with a facility of carry out reaction under vacuum or nitrogen blanketing or pressure and additionally facility of reaction under reflux or stripping out volatile.

In the second step of the process of the present invention more preferably the (olefinic unsaturated) allyloxy (polyethylene oxide) compound is used in an amount of from 0.9 to 1.3 mol of the H-content (Si—H) per 1 mol Si-bonded hydrogen in the hydrogen siloxane and more preferably the unsaturated alkoxy compound is used in an amount of from 1.0 to 1.15 mol per 1 mol Si-bonded hydrogen in the hydrogen siloxane. In one of the non-limiting embodiments, the allyloxy (polyethylene oxide) compound and the Si-bonded hydrogen in the hydrogen siloxane is reacted in the second step either simultaneously or stepwise and also either mixed together or dosed separately either at a predetermined rate or at a predetermined quantity at a predetermined interval.

The catalysts for the hydrosilylation reaction in the step 2 step preferably comprise a metal from the group of the platinum metals, or a compound or a complex from the group of the platinum metals. Examples of such catalysts are metallic and finely divided platinum, which may be present on supports, such as silicon dioxide, aluminum oxide or activated carbon, compounds or complexes of platinum, such as platinum halides, e.g. PtCl$_4$, H$_2$PtCl$_6$*H$_2$O, Na$_2$PtCl$_4$*4H$_2$O, platinum-olefin complexes, platinum-alcohol complexes, platinum-alkoxide complexes, platinum-ether complexes, platinum-aldehyde complexes, platinum-ketone complexes, including reaction products of H$_2$PtCl$_6$*H$_2$O and cyclohexanone, platinum-vinylsiloxane complexes, such as platinum-1,3-divinyl-1,1,3,3-tetramethyl-disiloxane complexes with or without detectable inorganically bonded halogen, bis(gamma-picoline)platinum dichloride, trimethylenedipyridineplatinum dichloride, dicyclopentadieneplatinum dichloride, dimethylsulfoxideethyleneplatinum(II) dichloride, cyclooctadiene-platinum dichloride, norbornadiene-platinum dichloride, gamma-picoline-platinum dichloride, cyclopentadiene-platinum dichloride, and also reaction products of platinum tetrachloride with olefin and primary amine or secondary amine, or primary and secondary amine, such as the reaction product of platinum tetrachloride in solution in 1-octene with sec-butylamine, or ammonium-platinum complexes.

Preferably, the reaction is carried out in between 70 to 110° C., more preferably from 80 to 100° C., in the presence of a catalyst, preferably hexachloroplatinic acid, preferably in the range of 500 to 5000 ppm by weight. The reaction is preferably carried out in absence of oxygen, i.e. in nitrogen under $N_2$ atmosphere.

Effective detergent compositions comprise anionic surfactants, particularly alkyl benzene sulfonate and alkyl sulfate surfactants. It has also been found beneficial for the appearance and cleaning of fabrics for laundry detergents to contain an amount of an enzyme sufficient to improve the appearance and cleaning of such fabrics, particularly after multiple cleaning cycles, but the anionic surfactant is important for cleaning and is an inexpensive source of generating substantial foam in washing. To improve upon the detergent effect of the laundry detergent formulation, further chemicals are often used, for example complex phosphates, non-ionic surfactants, soap noodles, different inorganic salts and other additives used for optimizing detergency effect.

In detergent powders, the main foaming component is an anionic surfactant. According to the present invention, when laundry detergent powder containing anionic surfactant, a large amount of foam is generated due to the anionic surfactant. The foaming nature of the detergent during prewash or in post wash does not change. But, when we reduce the amount of the anionic detergent the foaming and finally the cleaning benefit reduces.

In the rinse cycle, residual detergent transfers into fresh water from the fabric after squeezing the fabrics. Therefore, the rinse liquor foam density reduces significantly due to lesser amount of detergent i.e. the anionic surfactant present in the liquor and hence, as a result, due to very low concentration of the anionic surfactant, thereby loses its foaming nature and hence, foams in the rinse water are eliminated in significant amounts. Specially, in case of hand wash, no foam is observed after 4 rinses.

The details of the invention, its nature and objects are explained hereunder in detail in relation to the following non-limiting examples.

EXAMPLES (A) Synthesis Examples of Silicone Polymer

Example 1a) Preparation of 25-polyoxyalkylene-siloxane (According to Invention)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of $PNCl_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 7659 g of allyloxy(polyethylene oxide) (EO 25) (10% excess of 6.081 moles) available as Polymeg brand from IGL, India, these materials are in two phase and, and continue the reaction till all the allyloxy(polyethylene oxide) (EO 25) molecule reacts. After 1-2 min exotherm start (max 10° C.) and after 60 min materials become cleared continue for more 60 min. Check IR spectra for the conversion by unreacted H-concentration. Apply 0.2-0.5 kg/cm² $N_2$ purging at 100° C. for 1 h. Cool the reaction mixture to obtain a wax like material. The viscosity of the material at 50 deg C. is 150 mPa.

Example 1b) Preparation of 24-polyoxyalkylene-siloxane in Average (According to Invention)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of $PNCl_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane, the catalyst is then neutralized with soda ash. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 4865 g of allyloxy (polyethylene oxide) (EO 27) (preheated at 40° C.) (10% excess of 6.081 moles) and 760.64 g of allyloxy (polyethylene oxide) (EO 12) available as Polymeg brand from IGL India, these materials are in two phase, and continue the reaction till all the allyloxy (polyethylene oxide) (EO 27) molecule and allyloxy (polyethylene oxide) (EO 12) to form a 24-polyoxyalkylene-siloxane in average reacts. After 1-2 min exotherm start (max 10° C.) and after 60 min materials become cleared continue for more 60 min. Check IR spectra for the conversion by unreacted H-concentration. Apply 0.2-0.5 kg/cm² $N_2$ purging at 100° C. for 1 h. Cool the reaction mixture to obtain a wax like material. The viscosity of the material at 50 deg C. is 150 mPa.

Example 2) Preparation of 27-polyoxyalkylene-siloxane with 2 D [—$OSi(CH_3)_2$] Units (According to Invention)

Step 1—Synthesis of H-siloxane: Load 1500 g of H-siloxane (having 1.6% of Hydrogen concentration, i.e. 24 moles of H), 3332.34 g of disiloxane (24−3.43=20.57 moles) (Wacker BELSIL® DM 0 65), 4116 g of Wacker Belsil 10 (3.43 moles, as each unit has 14 D units so, 48 moles of D units will be there which will rearrange to form a siloxane chain with 1 Si—H and 2 D units) and 200 ppm of $PNCl_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 2250 g of Rearranged H-siloxane with 2 D-units (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 8247 g of allyloxy(polyethylene oxide) (EO 27) (10% excess of 6.081 moles) available as Polymeg brand from IGL, India, these materials are in two phase and, and continue the reaction till all the allyloxy(polyethylene oxide) (EO 27) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ $N_2$ purging at 100° C. for 1 h. Cool the reaction mixture to obtain a wax like material. The viscosity of the material at 50 deg C. is 165 mPa.

Example 3) Preparation of 19-polyoxyalkylene-siloxane (According to Invention)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of $PNCl_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 5819.5 g of allyloxy(polyethylene oxide) (EO 19) (10% excess of 6.081 moles) available as Polymeg brand from IGL, India, these materials are in two phase and, and continue the reaction till all the allyloxy(polyethylene oxide) (EO 19) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ $N_2$ purging at 100° C. for 1 h. Cool the reaction mixture to obtain a semisolid like material. The viscosity of the material at 50 deg C. is 90 mPa·s.

Example 4) Preparation of 30-polyoxyalkylene-siloxane with 3 D Units [—$OSi(CH_3)_3$] (According to Invention)

Step 1—Synthesis of H-siloxane: Load 1500 g of H-siloxane (having 1.6% of Hydrogen concentration, i.e. 24 moles of H), 3332.34 g of disiloxane (24–3.43=20.57 moles) (Wacker BELSIL® DM 0 65), 6171 g of Wacker Belsil 10 (5.143 moles, as each unit has 14 D units so, 72 moles of D units will be there which will rearrange to form a siloxane chain with 1 Si—H and 3 D units) and 200 ppm of $PNCl_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 2699 g of Rearranged H-siloxane with 3 D-units (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 8233.67 g of allyloxy(polyethylene oxide) (EO 30) (10% excess of 6.081 moles) available as Polymeg brand from IGL, India, these materials are in two phase and, and continue the reaction till all the allyloxy(polyethylene oxide) (EO 30) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ $N_2$ purging at 100° C. for 1 h. Cool the reaction mixture to obtain a wax like material. The viscosity of the material at 50 deg C. is 150 mPa·s.

Example 5a) Preparation of Tetramethyl Disiloxane with Two 25 Polyoxyalkylene on the Terminal Ends (According to Invention)

Step 2—Synthesis of polyoxyalkylene silicone: Load 160.8 g of tetramethyl-disiloxane (i.e. 2.4 moles of H), is taken in the reactor and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature add epoxycyclohexane and Pt catalyst (0.5% hexachloroplatinic acid in isopropanol) and slowly add drop by drop 2993 g of allyloxy(polyethylene oxide) (EO 25) (10% excess of 2.4 moles) available as Polymeg brand from IGL, India, these materials are in two phase and, and continue the reaction till all the allyloxy(polyethylene oxide) (EO 25) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ $N_2$ purging at 100° C. for 1 h. Cool the reaction mixture to obtain a wax like material. The viscosity of the material at 50 deg C. is 190 mPa·s.

Example 5b) Preparation of Siloxane with 15 D Units [—$OSi(CH_3)_3$] and with Two 25 Polyoxyalkylene on the Terminal Ends (According to Invention)

Step 2—Synthesis of polyoxyalkylene silicone: Load 1250 g of H-terminal having 15D siloxane (Wacker H-polymer 15 available from Wacker Chemie) (0.17% of H, i.e. 2.125 moles of H), is taken in the reactor and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature add epoxycyclohexane and Pt catalyst (0.5% hexachloroplatinic acid in isopropanol) and slowly add drop by drop 3024 g of allyloxy (polyethylene oxide) (EO 25) (10% excess of 2.3375 moles) available as Polymeg brand from IGL, India, these materials are in two phase and, and continue the reaction till all the allyloxy(polyethylene oxide) (EO 25) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a wax like material. The viscosity of the material at 50 deg C. is 190 mPa·s.

Example 6) Preparation of 12-polyoxyalkylene-siloxane (Comparative Example)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of PNCl$_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 3759.3 g of allyloxy(polyethylene oxide) (EO 12) (10% excess of 6.081 moles) available as Polymeg brand from IGL, India, these materials are in two phase and, and continue the reaction till all the allyloxy(polyethylene oxide) (EO 12) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a wax like material. The viscosity of the material at 25 deg C. is 130 mPa·s.

Example 7) Preparation of 18-polyoxyalkylene-siloxane (Comparative Example)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of PNCl$_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 5525.2 g of allyloxy(polyethylene oxide) (EO 18) (10% excess of 6.081 moles) available as Polymeg brand from IGL, India, these materials are in two phase and, and continue the reaction till all the allyloxy(polyethylene oxide) (EO 18) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a semisolid like material. The viscosity of the material at 50 deg C. is 80 mPa·s.

Example 8) Preparation of 25-polyoxyalkylene-siloxane with 20 D Units [—OSi(CH$_3$)$_3$] (Comparative Example)

Step 1—Synthesis of H-siloxane: Load 150 g of H-siloxane (having 1.6% of Hydrogen concentration, i.e. 2.4 moles of H), 333.2 g of disiloxane (2.06 moles) (Wacker BELSIL® DM 0 65), 4116 g of Wacker Belsil 10 (3.43 moles of PDMS having 14 D-units and 2 terminal trimethyl siloxy terminal units) and 200 ppm of PNCl$_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 lt reactor 2 h for complete distillation to obtain a Rearranged H-siloxane which will have 1 Si—H unit and 20 D units. Yield is 75 to 80% of the rearranged product of Rearranged H-siloxane.

Step 2—Synthesis of polyoxyalkylene silicone: 1702 g of Rearranged H-siloxane with 20 D-units (1 mole) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 1247 g of allyloxy(polyethylene oxide) (EO 25) (10% excess of 1 mole) available as Polymeg brand from IGL, India, these materials are in two phase and, and continue the reaction till all the allyloxy(polyethylene oxide) (EO 25) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a semisolid like material. The viscosity of the material at 25 deg C. is 250 mPa·s.

Example 9) Preparation of 31-polyoxyalkylene-siloxane (Comparative Example)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of PNCl$_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 It reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 9351.4 g of allyloxy(polyethylene oxide) (EO 31) (10% excess of 6.081 moles) available as Polymeg brand from IGL, India, these materials are in two phase and, and continue the reaction till all the allyloxy(polyethylene oxide) (EO 31) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a wax like material. The viscosity of the material at 50 deg C. is 180 mPa·s.

Example 10) Preparation of 40-polyoxyalkylene-siloxane (Comparative Example)

Step 1—Synthesis of H-siloxane: Load 1500 g of Wacker H-siloxane (having 1.6% of Hydrogen concentration, i.e. 24 moles of H), 4192 g of disiloxane (Wacker BELSIL® DM 0 65) (25.88 moles) and 200 ppm of PNCl$_2$ catalyst in SS reactor, Set temperature 105° C., Temperature Overshoot to 110-115° C., set temperature 108-110° C. Continue the reaction for 4 h, then start to distilled with 5° C. temperature increment up to 180° C. (time for 10 It reactor 2 h for complete distillation to obtain a Rearranged H-siloxane. Yield is 75 to 80% of the rearranged product of Rearranged H-siloxane.

Step 2—Synthesis of polyoxyalkylene silicone: 1800 g of Rearranged H-siloxane (6.081 moles) (from step 1) and increase the temperature 100-102° C. in a reactor. This reactor is equipped with control stirring and heating with a facility of carry out reaction under vacuum or nitrogen blanketing or pressure and additionally facility of reaction under reflux or stripping out volatile. At this temperature ad epoxycyclohexane and Pt catalyst (0.5% hexachloroplatinic acid in isopropanol) and slowly add drop by drop 12000 g of allyloxy(polyethylene oxide) (EO 40) (10% excess of 6.081 moles) available as Polymeg brand from IGL, India, these materials are in two phase and, and continue the reaction till all the allyloxy(polyethylene oxide) (EO 40) molecule reacts. After 1-2 min exotherm start (max 10° C.) and after 60 min materials become cleared continue for more 60 min. Check IR spectra for the conversion by unreacted H-concentration. Apply 0.2-0.5 kg/cm$^2$ N$_2$ purging at 100° C. for 1 h. Cool the reaction mixture to obtain a wax like material. The viscosity of the material at 50 deg C. is 250 mPa·s.

(B) Formulation Examples

Solid Foamable Silicone Composition Formulation Preparation Method:

The methyl ester used in the example for preparation as depicted in Table 1, is a fatty acid alkyl esters e.g. methyl esters of vegetable oils (Agnique ME 18 RD-F). As required to prepare the composition as described in Table 1, the methyl ester can be mixed in a container with the mentioned siloxane in the ratio as mentioned in Table 1 to perform the experiments.

Equipment used: 10 litre volume, Stainless steel plough shear mixer, with one side entry high speed dispersing tool, suitably jacketed for nominal pressure hot water/cold water heating and cooling. All shaft glands were N$_2$ purged. A suitable dust separator was installed at the loading hopper and the mixer was provided with a standard bottom outlet.

To the mixer was added 3.5 kg of commercial grade sodium carbonate powder having an average particle size of 125 μm, and the powder was stirred and heated to 130° C. under N$_2$ purge to dry the powder. After drying the powder for about an hour, the foamable composition [inventive (silicone foamable composition) or non-inventive] in fluid form or if is in wax form is heated from 35 to 50° C. to form a fluid (as described as Composition 1-33 as in Table 1) and was added by means of a metering pump at an elevated temperature of 50° C., to ensure uniform dispensing into the stirred mass. The addition of 1.5 kg of above fluid is completed in about 3 hours, while the temperature is maintained at 130° C. Mixing is continued for another hr after fluid addition. The powder is cooled to 40° C. before emptying from the mixer to obtain a solid foamable composition.

The details of the experiment and the protocol used for evaluation disclosed as in the published and granted patent number U.S. Pat. No. 8,481,476B2 from Wacker.

1) Blank Solid Detergent Formulation for Hand Wash:
Detergent Formulation for Hand Wash: Example (without Foamable Composition)
Linear Alkyl benzene sulfonate Salt=14.00 part
Sodium tripolyphosphate=26.40 part
Soda Ash=47.55 part
Sodium Sulphate=4.40 part
Sodium Perborate=6.85 part
Tetra Acetyl Ethylene Diamine=0.5 part
Perfume=0.30 part 2) Solid Detergent Formulation for Hand Wash with Inventive and Non-Inventive Silicone Composition:
Linear Alkyl benzene sulfonate Salt=8.4 part (14−5.6 part)
Sodium tripolyphosphate=26.40 part
Solid foamable composition [inventive (solid foamable silicone composition) or non-inventive]=1 part
Soda Ash=52.15 part (47.55+4.6 parts)
Sodium Sulphate=4.40 part
Sodium Perborate=6.85 part
Tetra Acetyl Ethylene Diamine=0.5 part
Perfume=0.30 part 3) Blank Detergent Formulation for Machine Wash:
Example without Foamable Composition (Inventive or Non-Inventive)
Linear Alkyl benzene sulfonate Salt=10.00 part
Soap=1.25 part
Lauryl alcohol 7 EO=2.00 part
Sodium tripolyphosphate=26.40 part
Soda Ash=47.9 part
Sodium Sulphate=4.40 part
Enzyme Protease=0.40 part
Sodium Perborate=6.85 part
Tetra Acetyl Ethylene Diamine=0.5 part
Perfume=0.30 part 4) Solid Detergent Formulation for Machine Wash with Inventive and Non-Inventive Silicone Composition:
Linear Alkyl benzene sulfonate Salt=6.00 part (=10 minus 4 parts)
Soap=1.25 part
Lauryl alcohol 7 EO=2.00 part
Sodium tripolyphosphate=26.40 part Solid foamable silicone composition (inventive or non-inventive)=1 part
Soda Ash=50.9 part (47.9+3 parts)
Sodium Sulphate=4.40 part
Enzyme Protease=0.40 part
Sodium Perborate=6.85 part
Tetra Acetyl Ethylene Diamine=0.5 part
Perfume=0.30 part (C) Performance Measurements 1) Performance Evaluation of Foaming without Fabrics (Hand Wash)
The Protocol Used for the Evaluation of the Respective Detergent in Buckets by Hand Washing was as Below:
a. 24° fH hard water.
b. fabric to liquor ratio was 1:10.
c. 4 gpl detergent (gpl=grams per liter).
d. lathering was performed for 20 sec
e. At the end of 20 seconds immediately note down the height of lather, the type of lather, stability of lather. This is reported as initial lather at time t=0 ($H_0$). The foam height ($H_{20}$) is again taken at 5, 10 or 20 minutes (t=0) intervals.

2) Performance Evaluation of Foaming with Fabrics (Hand Wash)
The Protocol Used for the Evaluation of the Respective Detergent in Buckets by Hand Washing was as Below
a. 24° fH hard water.
b. fabric to liquor ratio was 1:10.
c. 4 gpl detergent (gpl=grams per liter).
d. lathering was performed for 20 sec and the fabrics then immersed into the bucket of water. Water Quantity: 10.6 lit, Plastic Bucket: ~30 lit Capacity, uniform diameter of 34 cm, height 34.5 cm.
e. washing cycle maintained for 15 min or 30 min and the foam height measured, this is reported as initial lather at time t=0 ($H_0$). The foam height ($H_{20}$) is again taken at 5, 10 or 20 minutes (t=0) intervals.
f. the fabrics were squeezed to 50% weight pick up.
g. rinsing was done in each case in fresh 24° fH hard water in a ratio of part of rinse water 1 to 7 parts fresh water and then 5 seconds agitation the fabrics were then squeezed to 50% weight pick up and the foam height in bucket was measured.

3) Performance Evaluation (Machine Wash)
The Protocol Used for the Evaluation of Detergent in Top Load Automatic Machine
a. 24° fH hard water.
b. fabric to liquor ratio was 1:10.
c. 4 gpl detergent (gpl=grams per liter). Semiautomatic LG 7.2 Kg capacity Washing machine.
d. washing cycle maintained for 15 min or 30 min. The top lid of washing machine was opened just before discharging the washing liquor (as soon as top lid opened, machine stopped in operation automatically) and fabrics were removed by squeezing so that the fabric retained 50% wash liquor. After taking out the fabric, the foam height was measured.
e. The top lid was closed and the machine runs again. As soon as the machine discharged the washing liquor, the top lid of the machine was opened and the fabrics were transferred. The top lid of the machine was closed and immediately the machine was operated for the rinsing cycle. The top lid of the machine was opened just before discharged the 1st rinsing liquor. The fabrics were removed by squeezing so that fabrics contained 50% washed liquor. After taking out the fabric, the foam height was measured and noted as the 1st rinsing foam height.
f. The top lid was again closed and repeated as step 'f' for foam height measurement of the 2nd, 3rd & 4th rinsing.

(a) Foam Height Measurement:
The foam height is measured by using standard procedure take an initial foam height reading at t=0 min followed by 5 min measurements and a final t=20 min reading. Take the reading by measuring the foam production at the bucket at the highest average height to which the rim of the foam has reached, 5 such readings are taken and average done to note the final foam height, the value is noted for each composition and reported in Table 1.

(b) Foam Stability Measurement:
Foam Stability factor $(H_0-H_{20})*100/H_0$ in percentage, is determined by the difference of foam height (already measured) the initial foam height at time, t=0 ($H_0$) minus the foam height at time, t=20 minutes ($H_{20}$) multiplied by 100 and divided by the initial foam height. The lower the value of Foam Stability factor more stable the foam is, means the foam has been stable for longer time and do not settle down thus the difference is lowered and foam stability factor is less in value, which is noted for each composition and reported in Table 1.

(c) Measurement of the Foam Density:
Determination of density is done by Pyknometer method DIN EN ISO 2811-1. A pyknometer is filled with the foam generated under test by using the stated foam generation method. The density is calculated from the mass of the foam in the pyknometer and the known volume of the pyknometer. Metal pyknometer from ERICHSEN Germany is used with a volume of 100 cm$^3$. the density, ρ, of the product, in grams per cubic centimeter, at the test temperature, 25° C., using Equation $$\rho=(m_2-m_1)/V_t$$

where, $m_1$ is the mass, in grams, of the empty pyknometer;
$m_2$ is the mass, in grams, of the pyknometer filled with the product at the test temperature, 25° C.;
$V_t$ is the volume, in cubic centimetres, of the pyknometer at the test temperature.

Test Procedure:
Step 1. Foam is generated by lathering for 20 sec, using 10.6 lit of hard water (24° fH) in a bucket having 4 gpl detergents. Temperature of hard water (24° fH) should be maintained at 25° C. so that foam temperature during lathering is also maintained 25° C. Maintain the room temperature to 25° C. till experiment is completed.
Step 2. Cool the Pycnometer to 25° C. and then the take the weight of the empty Pycnometer (m1) in an electric balance which has maximum capacity 220 gm. Fill the Pycnometer with the foam (generated during lathering) up to top edge of Pycnometer. Filling of foam in the Pycnometer should carry out in such a way, no air from outside is trapped inside the Pycnometer. Pycnometer's lid is then placed on the top of the container and surplus foam escaping through the overflow hole is wiped off. Take the weight of the Pycnometer with foam (m2). Calculate foam density by using the above equation.
3. The experiment is repeated for 5 times and then take the average density and the result for each composition is noted down in Table 1.

(d) Cleaning Efficiency:
After the washing and rinsing cycle, a panel is formed of 5 people to rate the stain removal efficiency on a scale of 1 to 10. 10 being the highest efficiency and 1 being the lowest efficiency, the rating are noted and then averages of the five ratings are taken for each of the composition and noted down in Table 1.

It is further observed, according to the present invention, that the effects of the inventive silicone composition, when directly incorporated in a liquid laundry detergent with substantial reduced linear alkyl benzene sulfonate salt for the purpose of foam boosting during fabric washing by hand or by machine washing are similar to the effects obtained with blank liquid laundry detergents.

TABLE 1

Preparation of silicone composition and properties:

| Composition No. | Details of experiment | Difference | The foamable composition details in Solid Detergent Formulation of Formulation Example | Foam Height hand wash (cm) Without fabric, at t = 0 ($H_0$) | Foam Height hand wash (cm) Without fabric, at t = 20 ($H_{20}$) | Initial Foam Density (g/cc) | ($H_0$-$H_{20}$) (in cm) | Foam Stability factor = ($H_0$-$H_{20}$)* 100/$H_0$ (In %) | Post wash foam height hand wash (in cm) | Cleaning efficiency (scale of 1 to 10) |
|---|---|---|---|---|---|---|---|---|---|---|
| 0 | | Blank | | 19.5 | 12.5 | 0.003 | 7 | 35.90 | 5.5 | 7 |
| 1 | Inventive Detergent | | 19 EO TS (Ex. 3 fluid) | 18.5 | 13.5 | 0.0025 | 5 | 27 | 6.5 | 7 |
| 2a | Detergent with oxyalkylene siloxane (TS) with inventive D Si range | | 25 EO TS(Ex. 1a fluid) | 19.5 | 15 | 0.0027 | 4.5 | 23 | 6 | 7 |
| 2b | | | 24 EO average TS(Ex. 1b fluid) | 20 | 15 | 0.0026 | 5 | 25 | 6 | 7.5 |
| 3a | | | Disiloxane with 25 EO (Ex. 5a fluid) | 19.5 | 14.5 | 0.0025 | 5 | 25.6 | 6.5 | 7 |
| 3b | | | 15D siloxane with 25 EO terminal group(s) (Ex. 5b fluid) | 20 | 15.5 | 0.0023 | 4.5 | 22.5 | 6 | 7.5 |
| 4 | | | 27 EO with 2 D-unit (Ex. 2 fluid) | 19.5 | 14.5 | 0.0022 | 3.5 | 25.6 | 6 | 7.5 |
| 5 | | | 30 EO 3 D-unit (Ex. 4 fluid) | 17.5 | 13.5 | 0.0026 | 4 | 22.86 | 6.5 | 7.5 |
| 6 | Non Inventive Detergent with oxyalkylene siloxane less or more EO and more D Si units | Less No. of EO | 12 EO TS (Ex. 6 fluid) | 5 | 0.2 | 0.0065 | 5 | 100 | 0 | 4 |
| 7 | | No. of EO | 18 EO with 1 D-unit (Ex. 7 fluid) | 7 | 1 | 0.007 | 6 | 85.71 | 1 | 5 |
| 8 | | More No. of D | 25 EO in branch with 20 D-units (Ex. 8 fluid) | 8 | 1 | 0.0056 | 7 | 87.5 | 0.5 | 6 |
| 9a | | More No. of EO | 31 EO (Ex. 9 fluid) | 12 | 3 | 0.0089 | 9 | 75 | 1 | 7 |
| 9b | | More No. of EO | 40 EO (Ex. 10 fluid) | 11 | 2 | 0.009 | 9 | 81.8 | 1 | 7 |
| 10 | Inventive Detergent with oxyalkylene siloxane with methyl ester with the inventive weight ratio from 1:1 to 10:1 | | 19 EO (Ex. 3 fluid) + methyl ester (2:1) | 19 | 15 | 0.0045 | 2.5 | 21 | 6.5 | 8.5 |
| 11 | | | 24 EO average TS(Ex. 1b fluid) + methyl ester (2.75:1) | 20 | 15.5 | 0.003 | 2 | 22.5 | 7 | 10 |
| 12 | | | 27 EO 2 D-unit (Ex. 2 fluid) + methyl ester (5:1) | 18.5 | 15.5 | 0.0040 | 3 | 16.21 | 7 | 10 |
| 13 | | | 30 EO with 3 D-units (Ex. 4 fluid) + methyl ester | 18 | 14 | 0.0035 | 4 | 22.22 | 6.5 | 8 |

TABLE 1-continued

Preparation of silicone composition and properties:

| Composition No. | Details of experiment | Difference | The foamable composition details in Solid Detergent Formulation of Formulation Example | Foam Height hand wash (cm) Without fabric, at t = 0 ($H_0$) | Foam Height hand wash (cm) Without fabric, at t = 20 ($H_{20}$) | Initial Foam Density (g/cc) | ($H_0$-$H_{20}$) (in cm) | Foam Stability factor = ($H_0$-$H_{20}$)* 100/$H_0$ (In %) | Post wash foam height hand wash (in cm) | Cleaning efficiency (scale of 1 to 10) |
|---|---|---|---|---|---|---|---|---|---|---|
| 14a | | | Disiloxane with two terminal EO + methyl ester (2.75:1) | 19 | 13 | 0.0033 | 6 | 31.58 | 7 | 8 |
| 14b | | | 15D siloxane with 25 EO terminal groups (Ex. 5b fluid) + methyl ester (2.75:1) | 20.5 | 17 | 0.003 | 3.5 | 17.07 | 7 | 10 |
| 15 | Non Inventive | Detergent with | Absence of EO TS Ratio | only methyl ester | 3 | 0.5 | 0.015 | 2.5 | 83.33 | 1 | 1 |
| 16 | | Only methy ester & oxyalkylene siloxane with methyl ester of different non-inventive ratio & TS | Ratio | 25 EO TS (Ex. 1a fluid): methyl ester (1:2) | 9 | 1 | 0.011 | 8 | 88.89 | 1 | 5 |
| 17 | | | methyl ester | 25 EO TS (Ex. 1a fluid) + with lower alkyl/ alkylene ($C_5$) methyl ester | 10 | 1 | 0.0115 | 9 | 90 | 1.5 | 5 |
| 18 | | with other surfactant such as (EO)x type | other additive (co-surfactant) | 25 EO TS (Ex. 1a fluid) with other alkyl polyoxy-alkylene Emulgen grade surfactant | 11 | 2 | 0.015 | 9 | 81.82 | 1.5 | 6 |
| 19 | | | other additive (co-surfactant) | 25 EO TS with other alkyl polyglycoside of Triton grade surfactant | 7 | 1 | 0.015 | 6 | 85.71 | 1 | 6 |
| 20 | Non Inventive | Solid detergent with Oxyalkylene siloxane with methy ester with the noninventive ratio and different filler | Ratio | 7% of (25 EO TS + methyl ester (3:1)) and 93% $Na_2CO_3$ filler | 7 | 2 | 0.009 | 5 | 71.43 | 1 | 6 |
| 21 | | | Ratio | 40% of (25 EO TS + methyl ester (3:1)) and 60% $Na_2CO_3$ filler | 12 | 2 | 0.015 | 10 | 83.33 | 1 | 5 |
| 22 | | | Filler | 40% of (25 EO TS + methyl ester (3:1)) and 60% water soluble resin filler | 3 | 1 | 0.02 | 2 | 66.66 | 1 | 3 |

TABLE 1-continued

Preparation of silicone composition and properties:

| Composition No. | Details of experiment | Difference | The foamable composition details in Solid Detergent Formulation of Formulation Example | Foam Height hand wash (cm) Without fabric, at t = 0 ($H_0$) | Foam Height hand wash (cm) Without fabric, at t = 20 ($H_{20}$) | Initial Foam Density (g/cc) | ($H_0$-$H_{20}$) (in cm) | Foam Stability factor = ($H_0$-$H_{20}$)* 100/$H_0$ (In %) | Post wash foam height hand wash (in cm) | Cleaning efficiency (scale of 1 to 10) |
|---|---|---|---|---|---|---|---|---|---|---|
| 23 | Non Inventive | Ratio | 7% of (25 EO TS + methyl ester (3:1)) and 93% water with RH_ | 12 | 4 | 0.015 | 8 | 66.66 | 3 | 5 |
| 24 | Liquid detergent with Oxyalkylene siloxane with methy ester with the noninventive ratio | Ratio | 40% of (25 EO TS + methyl ester (3:1)) and 60% water with RH_ | 10 | 1 | 0.02 | 9 | 90 | 2 | 5 |
| 25 | Inventive At different temperature and pH | at 5° C. | 25 EO + methyl ester (2.75:1) | 17.5 | 14 | 0.0065 | 3.5 | 20 | 5 | 8.5 |
| 26 | | at 40° C. | 25 EO + methyl ester (2.75:1) | 18 | 15 | 0.0035 | 3 | 75 | 4 | 10 |
| 27 | | at pH 5 | 25 EO + methyl ester (2.75:1) | 18 | 14 | 0.0035 | 4 | 22.22 | 3 | 9 |
| 28 | | at pH 10 | 25 EO + methyl ester (2.75:1) | 19 | 16 | 0.0025 | 3 | 15.79 | 6 | 10 |
| 29 | | high hardness of water 90 fH at 25° C. | 25 EO + methyl ester (2.75:1) | 18 | 14 | 0.011 | 4 | 22.22 | 6 | 9 |
| 30 | Liquid detergent | | 20% (25 EO of Ex. 1 a fluid + methyl ester (2.75:1)) and 80% water with RH | 19.5 | 15.5 | 0.0025 | 4 | 20.51 | 5.5 | 9 |
| 31 | Non Inventive Other compared structures and compositions | Silane surfactant | bis-peg-18 methyl ether dimethyl silane available from DKSH | 7 | 0.5 | 0.015 | 6.5 | 92.85 | 0.5 | 5 |
| 32 | | only alkyl polyoxy alkylene surfactant | Fatty alcohol ethoxylates as Lutensol available from BASF | 8 | 0.5 | 0.01 | 7.5 | 93.75 | 1 | 6 |
| 33 | | molecule having PPG group | 25 PO TS prepared by hydrosilylation with rearranged H-siloxane with POLY (PROPYLENE OXIDE) MONOALLYL ETHER (20-30 PO) from Gelest (Cas No: 9042-19-7) | 11 | 2 | 0.008 | 9 | 81.80 | 1 | 5 |

Observation from the Experiments:

1) From the above experiments, it is observed that composition no. 14(b) of table 1, having siloxane with 15 D units [—OSi(CH$_3$)$_3$] and with two 25 polyoxyalkylene on the terminal ends of example 5(b) with the methyl ester gives the best result of foam height and stability and ever better than the blank detergent. This result is followed by the composition no. 3(b) of table 1, having the inventive composition with siloxane of example 5(b) with 15 D units [—OSi(CH$_3$)$_3$] and with two 25 polyoxyalkylene on the terminal ends. This is followed by the results of composition no. 11 where the inventive composition with 24-polyoxyalkylene-siloxane in average of example 1(b) with the methyl ester and further followed by the results of composition no. 2(b) of example 1(b) with 24-polyoxyalkylene-siloxane in average.

2) r Polyoxyalkylene siloxane having lower value of oxyalkylene groups (composition 6 & 7) and very high EO siloxane (composition 9A & 9B) also produces foam but does not match the foaming height and stability.

3) Another disadvantage of the polyoxyalkylene siloxane having higher number of oxyalkylene groups than the claimed range needs high temperature to melt and it breaks at such high temperature, so it is very difficult to process, melt, and spray it on the filler support.

4) Detergent composition having Pendent polyoxyalkylene in the siloxane having more D units [—OSi(CH$_3$)$_3$] i.e. Composition 8 with example 8 fluid having high D units do not foam and cleaning efficiency decreases.

5) Composition 17 showed that 25 polyoxyalkylene siloxane with added lower alkyl/alkylene methyl ester which is outside the claimed range reduces the cleaning efficiency drastically whereas in composition 11, 12, 13 and 14a and 14b we see that the inventive foaming silicone composition with appropriate alkyl/alkylene methyl ester synergistically boost the foaming and cleaning efficiency of the composition.

6) It is also found from experiments that the detergent with oxyalkylene siloxane having number of oxyalkylene group outside the claimed range of 19 to 30, and more D units from example 6 to 9b do not give the desired foaming and foam stability.

7) Again, from example 15 to 19, we see that detergent with only methyl ester & oxyalkylene siloxane with methyl ester of different non-inventive ratio, do not give the desired foam height and foam stability results.

8) For solid detergent composition 20 to 22 and for liquid detergent composition of 23 to 24, the detergent with oxyalkylene siloxane with methyl ester with the non-inventive ratio do not give the proper foaming result.

Also for composition 31 to 33, other compared silicone structures and compositions of the prior art do not give the desired foaming and foam stability properties.

9) It is also evident that the inventive composition in example 25 to 30, at different temperature and pH do give the desired foaming and foam stability characteristics along with the cleaning efficacy.

This result and experiments are non-limiting and is not restricted to this certain composition.

They may vary and minor variations in composition may give similar result.

The invention claimed is:

1. A solid foamable silicone composition comprising:
a) 10 to 35% of a silicone composition comprising:
a siloxane comprising a polyoxyalkylene group represented by the following general formula:

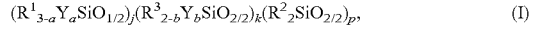

wherein, R$^1$ is the same or different and is an alkyl, alkenyl or aryl alkyl group having 1-20 carbon atoms, or an alkyl, alkenyl or aryl alkyl group having 1-20 carbon atoms and comprising a functional group, or mixtures thereof, Y is a polyoxyalkylene group having 19 to 30 oxyethylene groups, R$^2$ and R$^3$ are the same or different and is an alkyl, alkenyl or aryl alkyl group having 1-20 carbon atoms, or an alkyl, alkenyl or aryl alkyl group having 1-20 carbon atoms and comprising a functional group, wherein, a is 0 or 1, b is 0 or 1 or 2, where if a is 0 then p is 0 or an integer from 1 to 3, and if a is 1 then p is 0 or an integer from 1 to 50, j and k are independent of each other and are 0 or an integer from 1 to 50, where either j or k or both is at least 1, with the proviso that the siloxane contains at least one Y radical per molecule, b) 55 to 90% of a filler, wherein the filler is a carrier filler selected from the group consisting of sodium carbonate, sodium sulfate, aluminum silicate, potassium carbonate, potassium sulfate, sodium bicarbonate, potassium bicarbonate, and zeolite, wherein when b is 1 or 2 and a is 0, the siloxane has at least a pendant polyoxyalkylene group, and a number of silicon units in the siloxane with the pendant polyoxyalkylene group is 3 to 6; and when b is 0 and a is 1, the siloxane has at least a terminal polyoxyalkylene group, and a number of silicon units in the siloxane with the terminal polyoxyalkylene group is 15 to 20.

2. A liquid foamable silicone composition comprising:
a) 10 to 35% of a silicone composition comprising:
a siloxane comprising a polyoxyalkylene group represented by the following general formula:

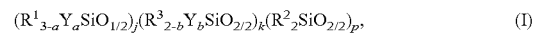

wherein, R$^1$ is the same or different and is an alkyl, alkenyl or aryl alkyl group having 1-20 carbon atoms, or an alkyl, alkenyl or aryl alkyl group having 1-20 carbon atoms and comprising a functional group, or mixtures thereof, Y is a polyoxyalkylene group having 19 to 30 oxyethylene groups, R$^2$ and R$^3$ are the same or different and is an alkyl, alkenyl or aryl alkyl group having 1-20 carbon atoms, or an alkyl, alkenyl or aryl alkyl group having 1-20 carbon atoms and comprising a functional group, wherein, a is 0 or 1, b is 0 or 1 or 2, where if a is 0 then p is 0 or an integer from 1 to 3, and if a is 1 then p is 0 or an integer from 1 to 50, j and k are independent of each other and are 0 or an integer from 1 to 50, where either j or k or both is at least 1, with the proviso that the siloxane contains at least one Y radical per molecule, b) 55 to 90% of a protic solvent, wherein when b is 1 or 2 and a is 0, the siloxane has at least a pendant polyoxyalkylene group, and a number of silicon units in the siloxane with the pendant polyoxyalkylene group is 3 to 6; and when b is 0 and a is 1, the siloxane has at least a terminal polyoxyalkylene group, and a number of silicon units in the siloxane with the terminal polyoxyalkylene group is 15 to 20.

3. The liquid foamable silicone composition of claim 2, wherein the liquid foamable silicone composition further comprises a surfactant or emulsifier.

4. The liquid foamable silicone composition of claim 2, further comprising a linear alkyl benzene sulfonic acid.

5. The liquid foamable silicone composition of claim 2, further comprising greater than 0 to 10% of an additive that improves the foamability of the silicone composition, wherein the additive is an alkyl or alkylene ester of a C6-C22 fatty acid.

6. The liquid foamable silicone composition of claim 2, further comprising an additive that improves the foamability of the silicone composition, wherein the additive is a methyl ester of a C6-C22 fatty acid.

7. The solid foamable silicone composition of claim 1 further comprising greater than 0 to 10% of an additive that improves the foamability of the silicone composition, wherein the additive is an alkyl or alkylene ester of a C6-C22 fatty acid.

8. The solid foamable silicone composition of claim 1 further comprising an additive that improves the foamability of the silicone composition, wherein the additive is a methyl ester of a C6-C22 fatty acid.

9. The solid foamable silicone composition of claim 1, wherein the siloxane containing a polyoxyalkylene group is represented by the formula:

$$Y_a R^1{}_{3-a}SiO(R^2{}_2SiO)_p(YR^3SiO)_m SiR^1{}_{3-a}Y_a \qquad (IV)$$

wherein, $R^1$ is the same or different and is an alkyl, alkenyl or aryl alkyl group having 1-20 carbon atoms, or an alkyl, alkenyl or aryl alkyl group having 1-20 carbon atoms and comprising a functional group, or an alkoxy, or a hydroxyl group or mixtures thereof, Y is a polyoxyalkylene group having 19 to 30 oxyethylene group, $R^2$ and $R^3$ are the same or different and is an alkyl, alkenyl or aryl alkyl group having 1-20 carbon atoms, or an alkyl, alkenyl or aryl alkyl group having 1-20 carbon atoms and comprising a functional group, wherein, a is 0 or 1, where if a is 0 then p is 0 or an integer from 1 to 3, and if a is 1 then p is 0 or an integer from 1 to 50, m is 0 or an integer from 1 to 50, with the proviso that the siloxane contains at least one Y radical per molecule.

10. The liquid foamable silicone composition of claim 2, wherein the siloxane containing a polyoxyalkylene group is represented by the formula:

$$Y_a R^1{}_{3-a}SiO(R^2{}_2SiO)_p(YR^3SiO)_m SiR^1{}_{3-a}Y_a \qquad (IV)$$

wherein, $R^1$ is the same or different and is an alkyl, alkenyl or aryl alkyl group having 1-20 carbon atoms, or an alkyl, alkenyl or aryl alkyl group having 1-20 carbon atoms and comprising a functional group, or an alkoxy, or a hydroxyl group or mixtures thereof, Y is a polyoxyalkylene group having 19 to 30 oxyethylene group, $R^2$ and $R^3$ are the same or different and is an alkyl, alkenyl or aryl alkyl group having 1-20 carbon atoms, or an alkyl, alkenyl or aryl alkyl group having 1-20 carbon atoms and comprising a functional group, wherein, a is 0 or 1, where if a is 0 then p is 0 or an integer from 1 to 3, and if a is 1 then p is 0 or an integer from 1 to 50, m is 0 or an integer from 1 to 50, with the proviso that the siloxane contains at least one Y radical per molecule.

\* \* \* \* \*